United States Patent [19]

Hiroshi et al.

[11] 4,312,132
[45] Jan. 26, 1982

[54] RAIL TYPE UNIVERSAL PARALLEL RULER DEVICE

[75] Inventors: Mutoh Hiroshi; Hikawa Masami; Watanabe Yoshihoi; Yamazaki Kouichi, all of Tokyo, Japan

[73] Assignee: Mutoh Industry, Ltd., Tokyo, Japan

[21] Appl. No.: 105,748

[22] Filed: Dec. 19, 1979

[30] Foreign Application Priority Data

Dec. 23, 1978 [JP] Japan ............................ 53-162228
Dec. 23, 1978 [JP] Japan ............................ 53-162231
Jul. 20, 1979 [JP] Japan ............................ 54-91482

[51] Int. Cl.³ .................................................. B43L 13/02
[52] U.S. Cl. ................................................ 33/438
[58] Field of Search ............... 33/403, 430, 438, 440, 33/442, DIG. 1; 308/10; 104/281, 282, 283, 286; 16/216, 217, 194

[56] References Cited

U.S. PATENT DOCUMENTS

| | | | |
|---|---|---|---|
| 3,390,462 | 7/1968 | Faul et al. | 33/438 |
| 3,441,331 | 4/1969 | Kesling | 104/283 X |
| 3,673,691 | 7/1972 | Gilbert | 33/440 |
| 3,771,797 | 11/1973 | Brown | 274/23 A |
| 4,070,758 | 1/1978 | Watanabe | 33/438 |

FOREIGN PATENT DOCUMENTS 1035764 7/1966 United Kingdom ............... 104/283

Primary Examiner—Harry N. Haroian
Attorney, Agent, or Firm—Wenderoth, Lind & Ponack

[57] ABSTRACT

A rail type universal parallel ruler device wherein a balance weight is provided which is connected to the head by means of a cord or the like and shifts along a vertical rail in a direction opposite to the shifting of the head. A fixed magnet is disposed along almost the entire length of the path of travel of the balance weight, and a magnet is provided on the balance weight opposed to the fixed magnet, and the balance weight is repulsed so as to be suspended as it moves along the path of travel by the magnetic force between the magnets.

12 Claims, 12 Drawing Figures

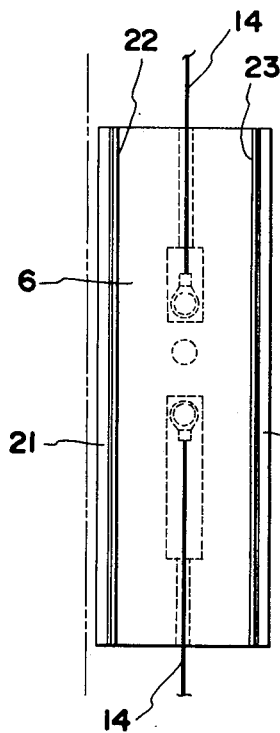
FIG. 3
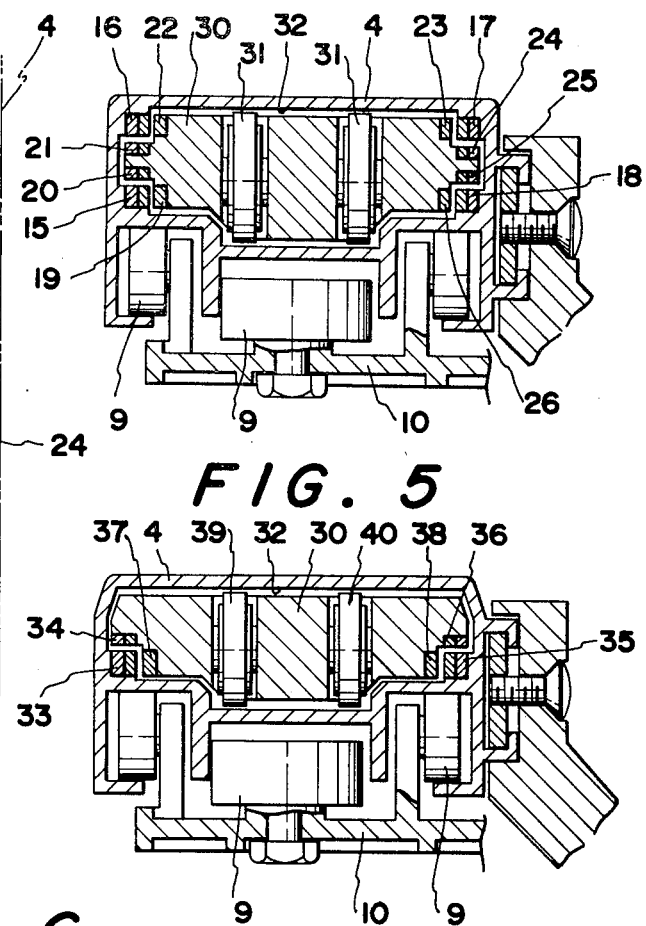
FIG. 4
FIG. 5
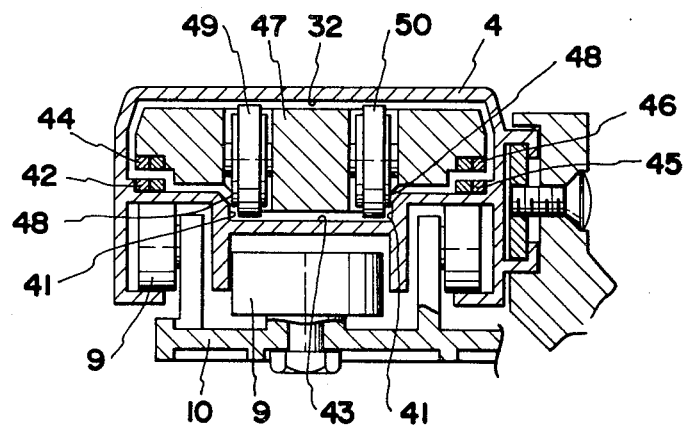
FIG. 6

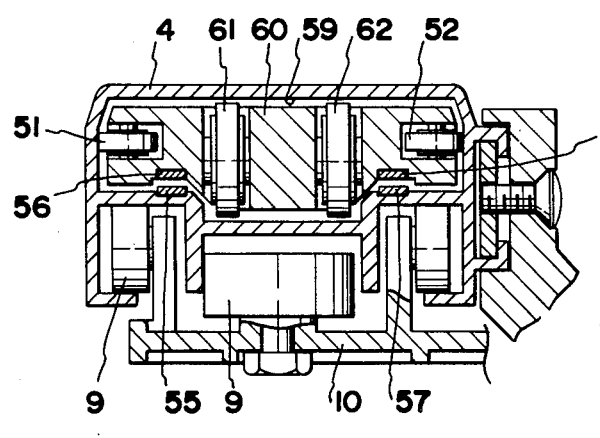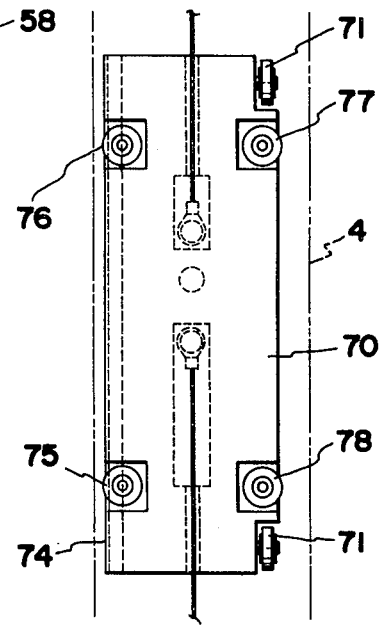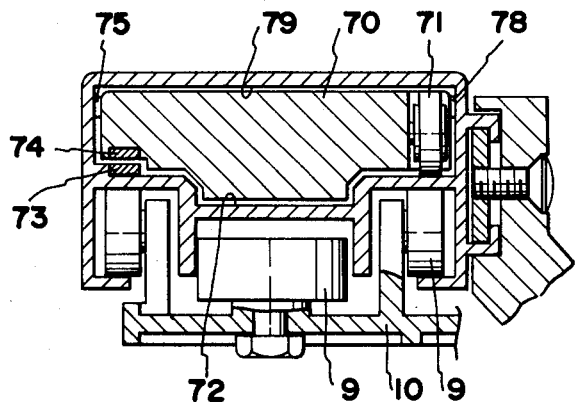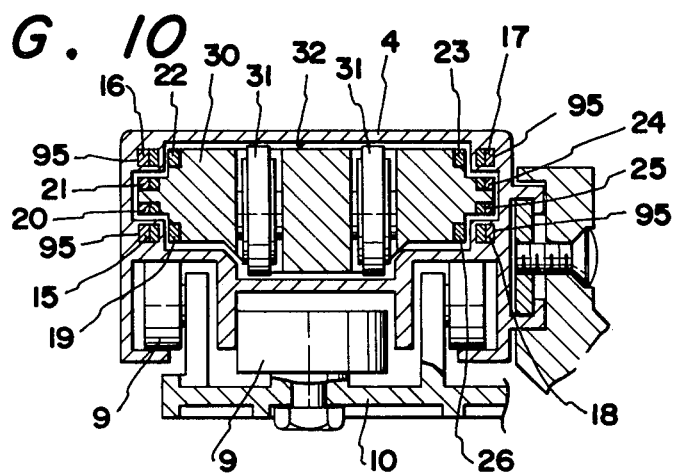

RAIL TYPE UNIVERSAL PARALLEL RULER DEVICE

The present invention relates to a rail type universal parallel ruler device having magnet means for causing the balance weight to move along the path of travel with little or no contact with the remainder of the device.

DESCRIPTION OF THE PRIOR ART

In the conventional rail type universal parallel ruler device, the balance weight travels in a cavity portion of the vertical rail in a direction opposite to the direction of movement of the head at the time of the shifting of the head. The balance weight rests its dead weight against the bottom wall surface of the cavity portion, namely, either directly or through a roller. There has therefore been the drawback that when the balance weight travels in the cavity portion, sound is produced by the frictional contact between the balance weight and the bottom wall surface of the cavity portion, and this sound can be a disturbing noise. Furthermore, when the balance weight travels, the side surface of the balance weight contacts the transverse vibration control surface formed in the cavity portion of the vertical rail due to the transverse vibration of the balance weight, and noise is caused by the contact, or the movement of the balance weight is retarded due to the friction caused by the contact.

SUMMARY OF THE INVENTION

It is principal object of the invention to provide means which allow the balance weight to travel smoothly along the path of travel by decreasing or eliminating contact friction between the balance weight and the surface defining the path of travel by causing a magnetic force to act on the balance weight in a direction to cause the balance weight to float, and also to decrease or eliminate the noise caused by at the contact of the balance weight with the surface along the path of travel.

It is another object of the invention to avoid the contact of the balance weight with the side wall surface of the cavity portion of the vertical rail at the time of travel of the balance weight by controlling transverse vibration during the time of traveling of the balance weight by the magnetic force of the magnet.

It is a further object of the invention to cause the balance weight to float due to a repulsion magnetic force acting between a plurality of rows of magnetic poles arranged in parallel with the path of travel of the balance weight and a plurality of rows of magnetic poles arranged parallel to the sides of the balance weight.

Whenever, the angle of inclination of a drawing board is changed, the load of the balance weight in a direction perpendicular to the guiding member is changed. For this reason, if the balance weight is caused to float by a magnetic force, the opposite gap between the balance weight and the guiding member is greatly changed by the change of load. As a result, there is a drawback that the space for accommodating the balance weight in the vertical rail, namely, in the guiding member, must be widened. This invention seeks to eliminate the foregoing drawbacks by arranging a plurality of rows of magnetic poles parallel to the opposed portion of the balance weight and the guiding member.

BRIEF DESCRIPTION OF THE DRAWINGS

FIG. 3 is a plan view of a vertically moving cursor.

FIG. 4 is a cross section showing an embodiment of a magnetic floating mechanism.

FIG. 5 is a cross section showing another embodiment of the magnetic floating mechanism.

FIG. 6 is a cross section showing another embodiment of the magnetic floating mechanism.

FIG. 7 is a cross section showing another embodiment of the magnetic floating mechanism.

FIG. 8 is a cross section showing another embodiment of the magnetic floating mechanism.

FIG. 9 is a plan view of a vertically moving cursor.

FIG. 10. is a cross section showing another embodiment of the magnetic floating mechanism.

DETAILED DESCRIPTION OF THE INVENTION

Figure 1:
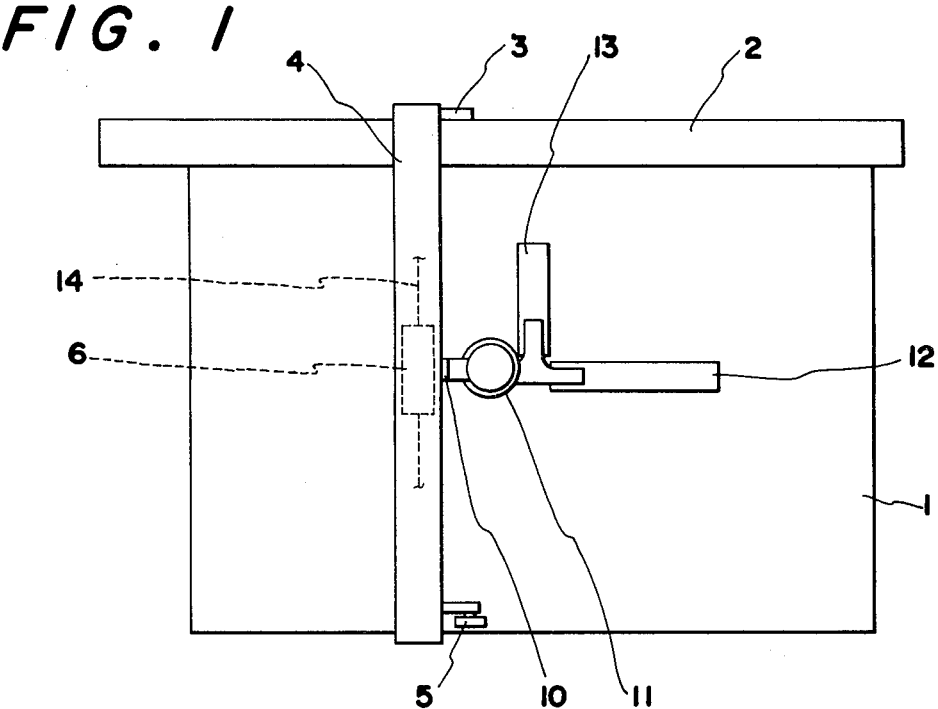
FIG. 1 is a general plan view of a rail type universal parallel ruler device.
Figure 2:
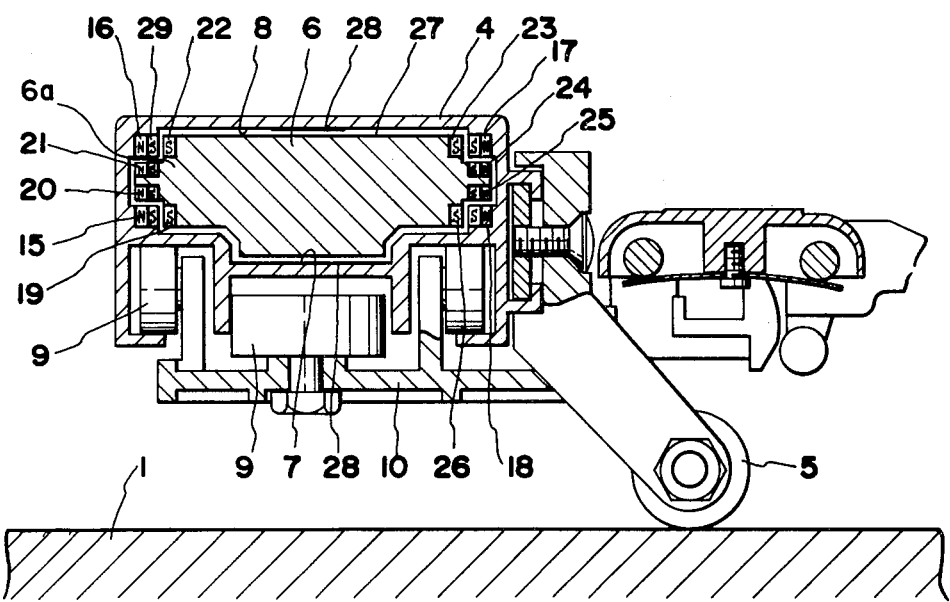
FIG. 2 is a cross section of a vertical rail.

In FIG. 1 through FIG. 3, there is shown a drawing board 1 fixed to a support frame of an inclined table (not shown) and being set at a desired angle between a horizontal condition and a perpendicular condition. A horizontal rail 2 is fixed to the drawing board by means of a vice type fixture, and a horizontal cursor 3 is shiftably connected to the horizontal rail. A vertical rail 4 has one end connected to the horizontal cursor 3 and a tail portion roller 5 mounted on the other end. A weight channel 7 defining the path of travel of a balance weight 6 is provided in the vertical rail 4 and extends along the entire length thereof in the longitudinal direction thereof, and a balance weight 6 having the proper weight is shiftably disposed in the channel 7. The channel 7 has a cavity portion 8. A vertical cursor 10 is shiftably mounted on the vertical rail 4 by means of a roller 9, and a head 11 is connected to the vertical cursor 10 by means of a hinge member. Straight edges 12 and 13 are mounted on the head 11. The vertical cursor 10 and the balance weight 6 are connected by a wire rope 14, and the wire rope 14 is extended around pulleys (not shown) rotatably mounted at both end portions of the vertical rail 4. When the vertical cursor 10 is shifted along the vertical rail 4, the balance weight 6 being connected with the vertical cursor 10, is shifted along the cavity portion 8 in a direction opposite to the direction of shifting the vertical cursor 10. The weight causing the shifting of the vertical cursor 10 in a downward direction along the vertical rail 4 which is due to the weight of the head 10 when the drawing board 1 is inclined is offset by the weight of the balance weight, and in the condition where the drawing board 1 is so as to offset the inertias, even if the hand of the operation is released from the head 11, the head 11 will not shift downwardly along the drawing board 1, but remains stationary in a stable mode at a desired position on the drawing board 1.

As shown in FIGS. 2 and 3, long magnetic members 15, 16, 17 and 18 are disposed along almost the entire length of the wall surface of the cavity portion 8 in the corners of the cavity portion and in this embodiment, a commercially available maganese aluminum magnet is employed as the magnetic members. Long magnets 19, 20, 21, 22, 23, 24, 25 and 26 are disposed on the balance weight 6 and these magnets are provided with polarities shown in the drawings. Magnets 15, 16, 17 and 18 each comprise two rows of poles of opposite polarity with both rows exposed along one side and facing across the cavity portion in one direction, but only one row facing across the cavity portion in a direction perpendicular to the one direction. The balance weight 6 has two projecting portions 6a and 6b extending between the sides of the magnets 15 and 16 and the magnets 17 and 18, respectively, and on the surfaces of the projecting portions are magnets 20 and 21 and 24 and 25 each comprising two rows of poles of opposite polarity with a row of one polarity facing the row of opposite polarity of opposed magnet 15, 16, 17 or 18. On the sides of the balance weight 6 opposed to the one row of poles of one polarity of magnets 15, 16, 17 and 18 are magnets 19, 22, 23 and 26 each comprising one row of poles of a polarity opposite the polarity of the opposed row of magnets 15, 16, 17 and 18, all as shown in the drawing. The magnets 15 and 20 and 18 and 25 cooperate for floating the balance weight 6 in the cavity 8 by the mutually repellant magnetic force. The magnets 16 and 21, and 17 and 24 cooperate for maintaining the gap between the upper surface of the balance weight 6 and the upper wall surface of the cavity portion 8 so that the balance weight 6 does not collide with the upper wall surface of the cavity portion 8 due to vibration during the travel of the balance weight 6 in the cavity portion 8. The magnets 15 and 19, 18 and 26 and 16 and 22 and 22 and 23 and 17 control the vibration at right angles to the direction of movement of the balance weight 6 in the cavity portion 8, and prevent a collision of the side portions of the balance weight 6 with the side wall surfaces of the cavity portion 8. The number of rows of poles in the magnets 15 and 18 may be 3 or 4 rows, since as long as there are a plurality of rows, satisfactory results can be obtained. on the entire surface of the balance weight 6 is a coating of Teflon 27 which is a frictional force decreasing material. Teflon tape 28 is applied to the inner wall surface of the cavity portion 8 which tends to contact the balance weight 6. A coating of the Teflon 29 is applied to all the magnets such as 15. The balance weight 6 floats freely in the cavity portion 8 as shown in the drawing due to the repellant magnetic force of the magnets.

In the foregoing construction, when the vertical cursor 10 is shifted along the vertical rail 4, the balance weight 6 travels quietly and smoothly in the cavity portion 8 of the vertical rail 4.

Figure 12:
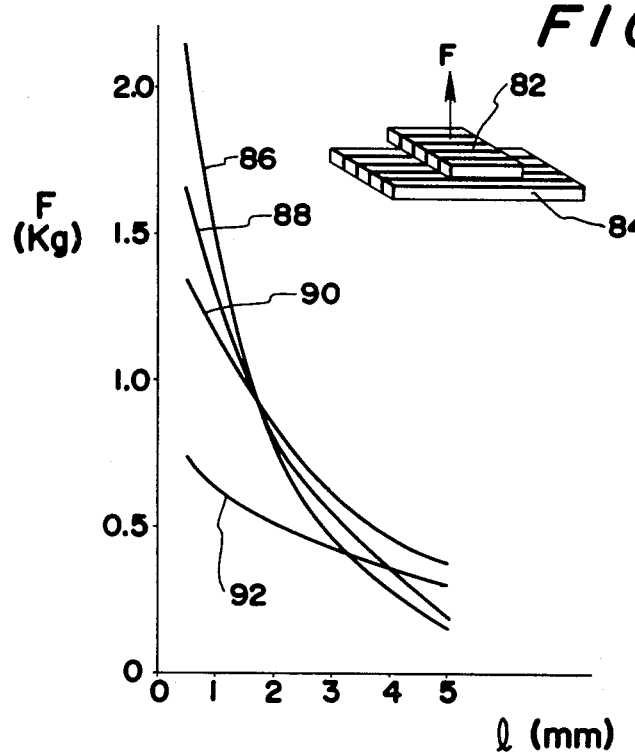
FIG. 12 is a diagram showing the characteristics of a magnet.

When the drawing board 1 is inclined, for example relative to the floor surface from the horizontal position, the force on the balance weight 6 due to its weight and directed perpendicular to the direction of travel in the cavity portion 8 of the vertical rail 4 is greatly decreased in comparison with the condition where the drawing board 1 is in the horizontal position. Accordingly, the balance weight 6 is caused to float from the traveling route 7 by the magnetic force of the magnets 15, 18. However, forces required to keep the balance weight floating are extremely small in this case. The reason for this is that the magnetic pole surfaces of the magnets 15 and 18 and 20 and 25 are formed by a plurality of rows of magnetic poles. Namely, as shown in FIG. 12, when the repulsion force is plotted on the ordinate and the gap between the opposed magnets 82 and 84 is plotted on the abscissa, where eight magnets 82 are arranged in parallel with rows of opposite polarity poles adjacent, and eight magnets 84 are arranged in parallel with rows of opposite polarity poles adjacent, and moreover the rows of like polarity poles of the magnets 82 and 84 are opposed, the gap repulsion force characteristic is according to the curve 86. Numeral 88 designates the characteristic curve for the case where there are six magnets 82 and 84, and numeral 90 the characteristic curve for the case where there are four magnets, and numeral 92 the characteristic curve for the case where there are two magnets.

As will be apparent from the foregoing characteristic curves, the greater the number of magnets and the more the number of magnetic poles, the steeper the characteristic curve becomes. That is although a bigger repulsion force may be obtained from a large number of magnets, the attenuation of repulsion force with a widening of the gap becomes greater.

This phenomenon leads to the conclusion that where the load applied to the magnet 82 in a downward direction is changed to decrease the load from a condition where there is a predetermined load such that the magnet 82 does not contact the magnet 84, the change of size of the gap between the magnet 82 and the magnet 84 is smaller if the number of magnetic pole rows constituting the magnets 82 and 84 is increased. This conclusion is obtained from the magnetic flux density distribution characteristics of FIG. 12 showing the text results obtained by a glass meter. That is, as the magnetic member is separated from the opposed magnetic pole surface, the magnetic flux density is attenuated, but the magnetic flux density of a magnet having a large number of rows of magnetic poles is attenuated much more than a magnet having a smaller number of rows of magnetic poles. Accordingly, when a magnet caused to float due to the repulsion force relative to an opposed magnet, and when the load urging the magnet toward the opposed magnet is changed from a maximum value to a minimum value, in order to minimize the change of size of the opposed gap between the pair of magnets, it is better to increase the number of parallel rows of magnetic poles of the magnet.

During the travel of the balance weight 6, there is a chance that the balance weight 6 contacts the wall surface of the cavity portion 8, but in such a case, because the frictional force reducing coatings 27 and 29 of Teflon and the Teflon tape 28 receive the contact, no large friction load acts on the balance weight 6. In another embodiment, instead of using Teflon as the frictional force decreasing means, the rollers can be used. One embodiment using the rollers is illustrated in FIG. 4. In FIG. 4, rollers 31 are rotatably mounted on the balance weight 30 which is caused to float by the magnetic force of the magnets in the cavity portion 8, and the surfaces of the rollers are opposed to the upper wall surface and the bottom wall surface of the cavity portion and an extremely small gap is left therebetween.

In the foregoing construction, when the balance weight 30 travels in the cavity portion 32, and vibration opposite to the direction of the magnetic forces of the magnets occurs, the surface of the roller 31 engages the wall surface of the cavity portion 32.

FIG. 5 shows another embodiment, and in the drawing, numerals 33, 34 and 35, 36 designate are magnets for causing the balance weight 30 to float about the bottom wall surface of the cavity portion 32, and because like polarities of the magnets are opposed, a repulsion magnetic force is derived.

Numerals 33, 37 and 35, 38 designate magnets for preventing transverse vibration of the balance weight 30 which is caused to float freely in the cavity portion 32, and the side portions of the balance weight 30 are prevented from contacting the side portions of the cavity portion 32 by the repulsion magnetic force. Numerals 39, and 40 designate rotatable rollers, and the surfaces thereof are opposed to the upper wall and bottom wall surface of the cavity portion 38 and are spaced slightly therefrom.

FIG. 6 shows another embodiment, and in the drawing, numeral 41 designates a control rail surface provided along the path of travel of the weight 47 in the cavity portion 32 along the entire length thereof, and the control rail surface is in light slidable contact with a transverse vibration control surface 48 on the balance weight 47 which otherwise floats freely in the cavity portion 32 due to the repulsion forces of the magnets 42, 44, 45 and 46.

Numerals 49 and 50 designate rotatable rollers and the surfaces are opposed to and spaced from the surfaces of the cavity portion 32.

In the foregoing construction, the balance weight 47 travels in the cavity portion 42 and is laterally guided by the control rail surface 41 but otherwise the balance weight 47 floats freely in the cavity portion 32 due to the repulsion forces of the magnets 42, 44, 45 and 46.

FIG. 7 shows another embodiment, and in the drawing, numerals 51 and 52 designate transverse vibration control rollers rotatably mounted on the balance weight 60 which floats freely in the vertical direction in the cavity portion 59 due to the repulsion forces of the magnets 55, 56, 57 and 58, and the surfaces of the rollers are in contact with the wall surfaces of both sides on the cavity portion 59. Numerals 61 and 62 designate rotatable rollers forming frictional force decreasing members, and the surfaces of the rollers are opposed to and spaced from the upper wall and bottom wall surfaces of the cavity portion 59.

FIGS. 8 and 9 show another embodiment in which one end of the balance weight 70 has a roller 71 thereon which is a frictional force decreasing member and rolls on the bottom of the cavity portion 79, and the other end thereof is caused to float by the repulsion force of the opposed magnets 73 and 74. Numerals 75, 76, 77 and 78 designate transverse vibration control rollers rotatably mounted on the balance weight 70, and each surface thereof is in contact with the wall surfaces on both sides of the cavity portion 79. The frictional force decreasing member may be other members in addition to the rollers, and may be of material other than Teflon. Also, the foregoing embodiment utilizes the repulsion magnetic force of the magnet, but it is of course possible to provide a construction by which the balance weight is suspended or caused to float by utilizing the attractive force of the magnets.

Figure 11:
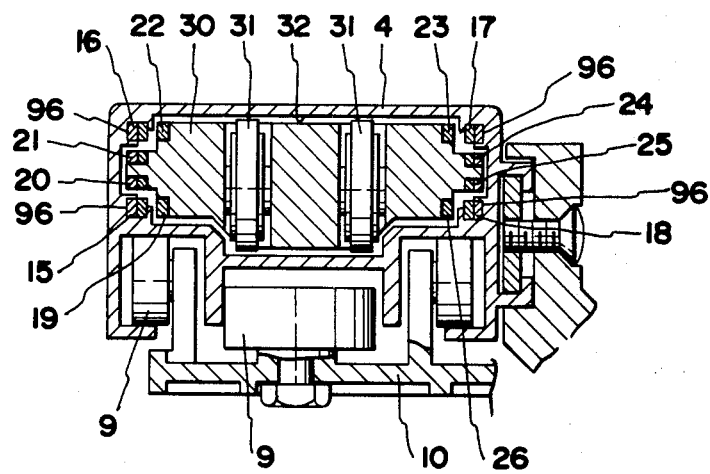
FIG. 11 is a cross section showing another embodiment of the magnetic floating mechanism.

Also, as shown in FIG. 10, a space 95 for holding a magnetic member is provided in each corner portion of the vertical rail 4, which is made of drawn aluminum, the space extending the entire length of the rail 4, and magnets, namely, magnetic members 15, 16, 17 and 18 are press fitted into the spaces 95. The cross sectional shape of the spaces for holding the magnetic member can have a shape indicated by numeral 95 in FIG. 11 and which open out of the corner portions into the interior of the rail. The mounting of the magnetic members on the vertical rail 4 can be accomplished easily by the provision of the spaces such as 95 and 96 for holding the magnetic members.

What is claimed is:

1. A rail type universal parallel ruler device comprising:
   a horizontal rail for mounting on a drawing board;
   a horizontal cursor mounted on the horizontal rail for shifting movement along the horizontal rail;
   a vertical rail connected to the horizontal cursor having a cavity extending in the longitudinal direction thereof;
   a vertical cursor mounted on the vertical rail for shifting movement therealong;
   a balance weight movable along said cavity and a flexible connecting member connected between the vertical cursor and the balance weight for moving in the opposite direction from the vertical cursor; and
   at least one pair of magnetic members, one magnetic member of the pair disposed along substantially the entire length of said cavity and the other magnetic member of the pair being on said balance weight and opposed to said magnet on said magnetic member along the cavity for producing a magnetic force in a direction opposite the direction said balancing weight is moved toward said vertical rail due to gravity for causing said balance weight to float relative to the walls defining said cavity during the movement of said balance weight along said cavity.

2. A rail type universal parallel ruler device as claimed in claim 1 in which said magnetic member along said cavity has a pole of one polarity facing said balance weight, and said magnetic member on said balance weight has a pole of the same polarity facing said magnetic member extending along said cavity.

3. A rail type universal parallel ruler device as claimed in claim 2 in which said magnetic members each comprise a magnet having a plurality of rows of magnetic poles extending parallel to each other.

4. A rail type universal parallel ruler device as claimed in claim 3 in which said vertical rail has a space therewith along the entire length thereof, and said magnetic member is press fitted into said space.

5. A rail type universal parallel ruler device as claimed in claim 4 in which said space is enclosed within the material of said vertical rail.

6. A rail type universal parallel ruler device as claimed in claim 4 in which said space is partially within the material of said vertical rail and opens into said cavity along the entire length thereof.

7. A rail type universal parallel ruler device as claimed in claim 1 in which there is only one pair of magnetic members, one on said balancing weight and one along said vertical rail, said pair of magnetic members being laterally offset transversely of the direction of movement of said balancing weight along said rail from the centerline of the path of movement of said balancing weight, and further comprising a weight supporting frictional force decreasing member between said balance weight and said vertical rail and on the other side of the centerline.

8. A rail type universal parallel ruler device as claimed in claim 1 in which there are two pairs of magnetic members, one pair of magnetic members being laterally offset in one direction transversely of the direction of movement of said balancing weight along said rail from the centerline of the path of movement of the balancing weight and the other pair of magnetic members being laterally offset in the other direction from the centerline, and said device further comprising frictional force decreasing means between said balancing weight and said vertical rail and facing in a direction transversely of the direction said balancing weight is moved toward said vertical rail due to gravity for guiding said balancing weight along said vertical rail in opposition to forces tending to move said balancing weight in said transverse direction.

9. A rail type universal parallel ruler device as claimed in claim 1 in which there are two pairs of magnetic members, one pair of magnetic members being laterally offset in one direction transversely of the direction of movement of said balancing weight along said rail from the centerline of the path of movement of the balancing weight and the other pair of magnetic members being laterally offset in the other direction from the centerline, further comprising additional magnetic members on said balancing weight on opposite lateral faces of the balancing weight and facing transversely of the direction of movement of the balancing weight along said vertical rail and facing said magnetic members of the respective pairs on said vertical rail and having a polarity relative to the polarity of the opposed magnetic members on said vertical rail for producing a magnetic force laterally of the balancing weight for guiding said balancing weight along said cavity between the laterally opposite surfaces of said cavity.

10. A rail type universal parallel ruler device as claimed in claim 1 in which there are four pairs of magnetic members, two pairs of magnetic members being laterally offset in one direction transversely of the direction of movement of said balancing weight along said rail from the centerline of the path of movement of the balancing weight and the other two parts of magnetic members being laterally offset in the other direction from the centerline, said cavity having a first side surface toward which said balancing weight is moved to gravity and a second side surface away from which said balancing weight is moved due to gravity and a pair of lateral surfaces on the opposite sides of said balancing weight transversely of the path along which said balancing weight moves, one magnetic member of each of the two pairs of magnetic members on each side of the centerline being on said first side surface and the other magnetic member of each of the two pairs of magnetic members being on the said balancing weight, and additional magnetic members on said balancing weight on opposite lateral faces of the balancing weight and facing transversely of the direction of movement of the balancing weight along said vertical rail and facing said magnetic members of the respective pairs on said vertical rail and having a polarity relative to the polarity of the opposed magnetic members on said vertical rail for producing a magnetic force laterally of the balancing weight for guiding said balancing weight along said cavity between the laterally opposite surfaces of said cavity.

11. A rail type universal parallel ruler device as claimed in claims 1, 2, 3, 4, 5, 6, 7, 8, 9 or 10 further comprising frictional force decreasing means disposed on said balance weight for reducing friction between said balancing weight and said vertical rail when said balancing weight accidentally strikes said vertical rail during movement of said balancing weight.

12. A rail type universal parallel ruler device as claimed in claim 1, 2, 3, 4, 5, 6, 7, 8, 9 or 10 further comprising frictional force decreasing means disposed on said vertical rail for reducing friction between said balancing weight accidentally strikes said vertical rail during movement of said balancing weight.

* * * * *